Patented May 11, 1943

2,319,009

UNITED STATES PATENT OFFICE 2,319,009

SHAPED ARTICLES MADE FROM VEGETABLE SEED PROTEINS AND PROCESS OF MAKING SAME

Andrew McLean, West Kilbride, Scotland, assignor to Imperial Chemical Industries Limited, a corporation of Great Britain No Drawing. Application June 3, 1940, Serial No. 338,625. In Great Britain June 19, 1939

13 Claims. (Cl. 8—115.5)

This invention relates to color-stable protein articles and methods of making the same; and it comprises shaped articles of color-stable proteins made by extrusion and otherwise of aqueous solutions, said shaped articles being characterized by non-development of discoloration under acid dye bath conditions and by showing no biuret reaction after treatment for 90 minutes at 97° C. in a bath containing 0.1 per cent sulfuric acid and 0.25 per cent sodium sulfate; and it further comprises a method of improving the wet-processing resistance and giving color stability to a protein article by treatment in a concentrated bath of a salt of a hydrohalic acid, said salt being the main constituent but the bath also containing formaldehyde, a salt of a reducing sulfur acid, and an acid having no oxidizing power on said salt; all as more fully hereinafter set forth and as claimed.

Textile fibers, films, filaments and other shaped articles are made by extruding aqueous solutions of various proteins, through narrow orifices into a setting or coagulating bath. Particularly useful in this relation are vegetable seed proteins, such as the globulins obtainable from peanuts or soy beans. The animal protein, casein, is also used. In making these articles by extrusion the aqueous solution is set (or "coagulated") in various baths but the articles at this stage are much swollen if exposed to water; and it is therefore customary to harden them. This is usually done by a bath containing an aldehyde, generally aqueous formaldehyde. After the hardening operation, however, swelling with water is still undesirably high and in after-processing the surfaces of the article tend to stick together on drying. The articles are, moreover, lacking in resistance to wet processing with hot dilute acid solutions, such as those which are encountered in acid dyeing. While the amount of swelling can be reduced and the handling of the shaped article facilitated by dehydrating baths, such as strong saline solutions or glycerine, these treatments do not produce any permanent resistance to wet processing after the dehydrating agent has been removed.

In British Patents Nos. 492,677 and 495,332, in U. S. Patent 2,189,481 and in U. S. application S. N. 263,094, treatments are described which permanently improve the resistance to wet processing of the hardened protein. But following such treatments it is sometimes found that the shaped article of coagulated protein develops an undesirable colour during subsequent wet processing in weakly acid baths, even when the protein from which it has been prepared is practically colourless. The origin of this colour development is uncertain, and the application of bleaching agents in ordinary fashion previous to acid processing does not prevent its formation.

The seeds from which the vegetable seed protein is prepared are surrounded by a testa which is frequently highly colored, and the protein may develop color on treatment with dilute acid or alkali. In the case of peanuts this is often true even if the testa is removed. "Blanched peanuts" are peanuts from which the red skins or testa has been removed. The seed itself is sometimes liable to be stained by the colouring material of the testa, so that even blanched seeds do not invariably yield a protein free from undesirable colouring matter. The method by which the protein is prepared may considerably influence the extent to which it is coloured by the colouring material of the testa, but it is not always possible or convenient to ensure that protein free from undesirable colouring matter is available for the manufacturer of the shaped article. The colour can be discharged by some ordinary bleaching agents, but the article darkens again on washing it with hot dilute alkalis. This is even true if the bleaching agent is one which acts through the liberation of sulphur dioxide.

The present invention has as an object to devise a method whereby the coagulated protein shaped article may be hardened and rendered permanently resistant to wet processing, for example to the swelling action of water or of hot dilute acid solutions such as are encountered in acid dyeing, and protected against the development of an undesirable colour during wet processing with such acid solutions. A further object is to devise a method whereby the shaped article is rendered lighter in colour and protected against darkening on treatment with hot dilute alkali. A still further object is to provide bleached, hardened and acid dye bath resistant protein articles. A still further object is to devise a new method of bleaching such protein articles. Further objects will appear hereinafter. These objects are accomplished by the following invention.

I have found that the shaped article of coagulated protein can be bleached, hardened and rendered acid-dyebath resistant if it is treated with an aqueous medium comprising a concentrated solution of a salt of a halohydric acid; formaldehyde, or a substance yielding formaldehyde under the conditions of the treatment; a salt of a reducing sulphur acid, in which the atomic proportion of oxygen, if present, to sulphur, reckoned on the anhydrous salt, does not exceed 2:1, and an acid which does not oxidise the said salt of the reducing sulphur acid, and is substantially completely ionised in dilute aqueous solution.

The treatment is carried on for a period of time and at a temperature sufficient to render the shaped article resistant to the destructive action of an acid dye bath such as is used in wool dyeing; the correct time and temperature being readily determinable by test, as described below.

The treatment may be applied to the coagulated shaped article fresh from the coagulating bath or more conveniently after it has been washed in an aqueous saline solution or a solution of an organic dehydrating agent to remove at least a portion of the coagulating agent associated with the wet material.

The salt of the halohydric acid may be an alkali metal, alkaline earth metal or ammonium halide, and it must be present in a high concentration, advantageously not less than 30 parts of the anhydrous salt per 100 parts water. The solubility of sodium chloride is thus sufficient to enable it to be used for the purposes of the invention. The acid used in the bath is one normally capable of decomposing the salt of the reducing sulphur acid without oxidising it. Hydrochloric acid, hydrobromic acid and sulphuric acid are examples of suitable mineral acids for the purpose. The salt of the reducing sulphur acid may conveniently be a soluble thiosulphate, sulphide, sulphoxylate, hydrosulphite or tetrathionate. While it has been customary in the past to employ certain of these materials for bleaching purposes in an alkaline condition, it is essential according to the present invention both to obtain the desired protection against the development of undesirable colour, and to ensure that the coagulated protein articles shall be resistant to wet processing, that the acid should be present in the treating bath. The rapidity with which the coagulated protein is rendered resistant to wet processing tends to increase with increased formaldehyde concentration and with increasing concentration of acid, but the concentration of the acid and of the sulphur acid salt cannot be indefinitely varied in the bath, for the bleaching efficacy of the bath is dependent on a modification by the presence of formaldehyde of the products of reaction that would normally occur as a result of the reaction between the salt of the reducing sulphur acid and the acid used. Although a certain latitude is permissible the amount of acid should be approximately chemically equivalent to that of the salt of the reducing sulphur acid, and the amount of formaldehyde in relation to the salt of the sulphur acid should be sufficient to prevent the formation of sulphur or the gas evolution that would otherwise take place as a result of the presence of the acid. This quantity will vary with the sulphur acid salt used, the temperature, and also with time of treatment, relative to the protein present, as formaldehyde is used up in hardening the protein. If less acid than an equivalent to the salt of the reducing sulphur acid is employed, not only is the efficacy of the bath in rendering the protein resistant to wet processing reduced, but a wastage of the salt of the sulphur acid necessarily results. Moreover, in certain cases as, for instance, when a hydrosulphite is used, sulphur is precipitated and spoils the product. On the other hand, if too little of the salt of the sulphur acid is employed in relation to the amount of acid present, the bleaching efficiency of the bath is reduced. With regard to absolute quantities, even fractional percentages of formaldehyde will have a hardening effect and similar quantities of the sulphur acid salt and acid have a bleaching action, while the upper limits appear to be determined only by the saturation of the solution. In the case of thiosulphate, sulphoxylates, sulphides and hydrosulphites, it is essential that the acid should not be introduced into the bath containing the salt of the reducing sulphur acid before the formaldehyde has been introduced. Hydrochloric acid or sulphuric acid may coveniently be employed as the free acid. The halogen acid salt, however, may be introduced into the bath at any stage. Preferably the halogen acid salt, the sulphur acid salt and the formaldehyde are mixed in aqueous solution and the acid added subsequently.

The main dissolved constituent of the bath on a weight basis is in all cases saline, being the salt of the halohydric acid; and the other constituents are present in minor modifying amounts. As stated, the upper limits for the proportions of formaldehyde, acid and salt of the sulfur acid, are determined only by the amount of them that can be dissolved in a concentrated brine. Even with high proportions of acid the bath is not very acidic. And with other halides and other acids as specified, acidity is below a dangerous point.

The bath may be employed at ordinary or raised temperatures, the latter being preferable on account of the shorter time required for the treatment.

After removal from the treatment bath the articles may be thoroughly washed with water. For textile and certain other purposes, however, it is desirable that the article should be left in a less acid condition than can be achieved by washing with water alone; and it is convenient, after a preliminary washing with water, further to treat the article with a weakly alkaline solution, for instance one of sodium carbonate, bicarbonate, or sesquicarbonate, borax or the like. This is especially desirable when the filaments are to be mixed with wool, since the mixed yarns so obtained can be dyed to a level shade in one process with ordinary wool acid dyes, and if desired, in the piece, after weaving.

After the dilute alkaline treatment and subsequent washing the fibre or filament should yield washings of pH 7 to 8 when boiled with water.

The resistance of the fibre to an acid dye bath can be tested by treating the article for 90 minutes at 97° C. with a bath containing 0.1% sulphuric acid and 0.25% sodium sulphate. If the resistance-giving process has been completed the article will stand this treatment and can be washed and dried thereafter without damage. If after treating the article the sulphuric acid-sodium sulphate bath is mixed with an equal volume of 40% caustic soda and 2 or 3 drops of 1% $CuSO_4 \cdot 5H_2O$ solution is added, no colour change will show if the resistance-giving process has been completed; but if after treatment with the sulphuric acid-sodium sulphate both the articles lose their identity by coalescence or if the bath shows the presence of a biuret group by turning to a violet to rose pink shade after the addition of the caustic and copper sulphate, then the resistance-giving process has not been carried to completion.

The invention is further illustrated by the following examples, in which the parts mentioned are, unless otherwise stated, parts by weight.

Example 1

4 parts sodium hydrosulphite dihydrate are stirred into 120 parts nearly saturated sodium chloride solution at room temperature and gently warmed until all the hydrosulphite is dissolved, and 3.6 parts of 40% commercial formaldehyde solution are then added to the solution. 4.8 parts 33% hydrochloric acid are next added at a slow rate with stirring, and there is thus obtained an almost clear and colourless liquor. This bath is then used for the treatment of filaments obtained by precipitation with an acid salt bath from an extruded solution of peanut protein dissolved in 30% urea solution and aged for 24 hours. These are of a strong reddish colour. The peanut protein is derived from unblanched peanut material by extraction with dilute alkali. The filaments are washed in sodium chloride solution and then placed in loose bundles in the above described bath. The bath and the bundles of filaments contained in it are heated to 35° C., and after remaining in the bath for 15-20 hours the now hardened filaments are taken out, drained, washed thoroughly in water and dried in air at about 30° C. They are greatly reduced in colour, and after treatment with boiling water dry satisfactorily. They are satisfactorily resistant to a hot acid bath as used for dyeing wool, and do not develop a colour on treatment with dilute acid or with dilute alkali.

Example 2

The filaments and treatment are exactly the same as in Example 1 except that only half the quantities of sodium hydrosulphite dihydrate and hydrochloric acid are employed. The hardened filaments dry satisfactorily after treatment with boiling water and are satisfactorily resistant to wet processing in a hot dilute acid bath as used for dyeing wool. They are slightly darker than the hardened filaments obtained according to Example 1, but the wet processing in dilute acid does not develop any undesirable colour.

Example 3

The filaments used are the same as in Example 1. The bath is made from 120 parts saturated sodium chloride solution, 3.6 parts commercial formaldehyde solution of 40% concentration, 4.8 parts sodium thiosulphate pentahydrate and 4.8 parts 33% hydrochloric acid, the last mentioned ingredient being added to the solution containing the other three. The filaments are treated for 18 hours at 35° C., and the hardened filaments are bleached to a pale colour, and can be dried satisfactorily after treatment with boiling water. They are also satisfactorily resistant to wet processing in the dilute acid bath.

Example 4

The materials and treatment are the same as in Example 3, except that the treatment is carried out for 3 hours at 50° C. instead of 18 hours at 35° C. The hardened products are similar to those of Example 3.

Example 5

The materials and treatment are as in Example 3, except that the treatment is carried out for 30 minutes at 70° C. The hardened product is not so well bleached as in Example 3, but it dries satisfactorily after treatment with hot water and processing in the dilute acid bath.

Example 6

The materials and treatment are as in Example 5 except that the treatment is carried out for 1 hour at 70° C. The hardened filaments are bleached to a pale colour and withstand the wet processing satisfactorily.

Example 7

The filaments used are as in the preceding example, but the bath is made up from 120 parts saturated sodium chloride solution, 0.3 part sodium thiosulphate pentahydrate, 1.8 parts 40% formaldehyde, 0.3 part 30% hydrochloric acid. The filaments are treated in the bath for 4 hours at 70° C., and the hardened filaments are bleached to a pale colour and withstand the wet processing treatment satisfactorily.

Example 8

The filaments used are as in the preceding examples. The bath is made from 120 parts saturated sodium chloride solution, 1.6 parts sodium sulphide, 3.6 parts 40% formaldehyde, and 4.8 parts 30% hydrochloric acid. The treatment is carried out for 4 hours at 70° C. The hardened filaments resemble those obtained in the preceding example.

Example 9

The bath and treatments are as in the preceding example except that the concentrations of sodium sulphide, formaldehyde and hydrochloric acid in the saturated salt bath are reduced to one third. The hardened filaments are not quite so well bleached as in the preceding example, but withstand the wet processing satisfactorily.

Example 10

The filaments used are as in the preceding examples. The bath is made up from 120 parts saturated sodium chloride solution, 2.8 parts sodium tetrathionate ($Na_2S_4O_6$), 1.8 parts 40% formaldehyde solution and 2.4 parts 30% hydrochloric acid. The treatment is carried out for 4 hours at 70° C. The hardened filaments are bleached to a good colour and withstand wet acid processing.

The amount of protein filament used in the preceding examples is about 3 to 4 parts by weight.

Instead of the peanut protein used in the above examples, casein, soya bean protein or any other vegetable seed protein can be used.

Instead of the hydrochloric acid any other acid can be employed which does not oxidise the salt of the reducing acid and which is substantially completely ionised in solution, such as hydrobromic acid, or sulphuric acid.

This invention is a valuable advance in the art as such shaped articles as fibres made from protein can be mixed or woven with wool to produce new textiles, and the problem of dyeing such textiles evenly in light shades has been solved by this invention. It is true that white protein fibres have previously been obtained, for instance casein fibres, but a casein fibre which will have such resistance to an acid dye bath as not to leave even traces of a biuret group in the dye bath after dyeing is new and this invention discloses not only how to produce such new fibres but how to control their colour.

As many apparently widely different embodiments of the invention can be made without departing from the spirit and scope thereof it must be understood that the invention is not limited to any specific embodiment except as defined in the appended claims.

I claim:

1. A method of treating shaped articles of coagulated protein to render them stable to discoloration and swelling in acid dye baths, which comprises treating such an article in a bath which comprises a concentrated aqueous solution of a salt of a hydrohalic acid, said salt being the major constituent of the bath, the bath containing a compound of the class which consists of formaldehyde and substances which yield formaldehyde under the conditions of the treatment, and containing a salt of a reducing sulphur acid in which the atomic proportion, reckoned on the anhydrous salt, of oxygen, if present, to sulphur does not exceed 2:1, and an acid, which does not oxidise the salt of the sulphur acid, and is substantially completely ionised in dilute aqueous solution, the acid being present in amount approximately chemically equivalent to the salt of the reducing sulfur acid.

2. The method of claim 1 wherein the salt of the reducing sulfur acid is a hydrosulfite.

3. The method of claim 1 wherein the treatment is carried out at a temperature of 35° C. to 70° C.

4. The method of claim 1 to which are added the steps of removing the article from said bath and washing with water.

5. The method of claim 1 to which are added the steps of removing the article from the bath, washing with water and washing with a weakly alkaline solution.

6. The treatment as claimed in claim 1 when applied to shaped articles of coagulated vegetable seed proteins.

7. The treatment as claimed in claim 1 when applied to shaped articles of coagulated peanut protein.

8. The treatment as claimed in claim 1 in which the acid is hydrochloric acid.

9. The treatment as claimed in claim 1 in which the acid is hydrobromic acid.

10. The treatment as claimed in claim 1 in which the acid is sulphuric acid.

11. In further treating hardened shaped protein articles made resistant to wet-processing by various treatments, the process of giving color stability thereto and enhancing the resistance thereof to acid dyebath conditions which comprises treating such an article with a strong saline halide solution containing minor amounts of formaldehyde, a salt of a reducing sulfur acid, and an acid having no oxidizing power on said salt; said salt of the reducing sulfur acid and said acid being present in substantially chemically equivalent amounts.

12. A shaped article of hardened coagulated vegetable seed protein in bleached condition having the property of withstanding treatment for 90 minutes at 97° C. with a bath containing 0.1 per cent of sulfuric acid and 0.25 per cent of sodium sulphate without rendering the presence of a biuret group detectable in the bath and without darkening in color and further characterized by the ability to withstand treatment with hot dilute alkali without darkening in color.

13. An article as defined in claim 12 wherein the vegetable seed protein comprises peanut protein and wherein the shaped article is in the form of textile fibers.

ANDREW McLEAN.